United States Patent Office 3,451,892
Patented June 24, 1969

3,451,892
PROCESS FOR THE PREPARATION OF
STEROIDAL COMPOUNDS
Hershel L. Herzog, Glen Ridge, and Adriano Afonso,
East Orange, N.J., assignors to Schering Corporation,
Bloomfield, N.J., a corporation of New Jersey
No Drawing. Filed Oct. 19, 1965, Ser. No. 498,076
Int. Cl. C12b 1/00; C07c 169/00
U.S. Cl. 195—51                                    5 Claims

---

ABSTRACT OF THE DISCLOSURE

A 3-hydroxy-19-nor-$\Delta^{1,3,5(10)}$-analog of a sterol or an ether or ester derivative thereof upon treatment with a microorganism capable of utilizing a sterol as a sole carbon source is converted to a 3-hydroxy-17-keto-19-nor-$\Delta^{1,3,5(10)}$-C-18-steroid or an ether thereof. Microorganisms useful in this process include certain species within the genera Corynebacterium Nocardia, Proactinomyces, Pseudomonas, and Mycobacterium. Examples describe in detail the preferred species of the process, i.e. the preparation of estrone by the microbiological action of Corynebacterium sp., ATCC 14887 (Nocardia restrictus) on each of 19-nor-1,3,5(10) - cholestatrien-3-ol, 19-nor-1,3,5(10)-campestatrien-3-ol, 19 - nor - 1,3,5(10)-stigmastatrien-3-ol and the acetate esters thereof. Also described is the conversion of the 3-methoxy ethers of the foregoing to estrone methyl ether via the action of Corynebacterium sp. ATCC 14887 (Nocardia restrictus).

---

This invention relates to a novel process and to novel intermediates produced thereby.

More particularly, this invention relates to the conversion of a sterol to an aromatic-A-ring-C-18 steroid via the microbiological degradation of aromatic-A-ring intermediates derived from sterols.

More specifically, this invention relates to the microbiological treatment of a 3 - hydroxy - 19 - nor - $\Delta^{1,3,5(10)}$-analog of a sterol or an ether or ester derivative thereof by a microorganism (or its enzymatic extract) which is capable of utilizing a sterol as a sole carbon source, said microbiological treatment being continued until the sterol side chain at C–17 of the 19-nor-$\Delta^{1,3,5(10)}$-sterol analog is oxidatively cleaved, and there is formed a 3-hydroxy-17-keto-19-nor-$\Delta^{1,3,5(10)}$-C-18 steroid or an ether thereof (i.e. estrone and 3-ethers thereof), as determined by standard analytical procedures.

Specifically, this invention relates to the conversion of a sterol e.g. β-sitosterol, campesterol, and chloesterol) to a 17-keto-C-18 steroid (e.g. esterone and derivatives thereof) by subjecting a 3-hydroxy-$\Delta^{1,3,5(10)}$-derivative of said sterol or a 3-ester or 3-ether derivative thereof (e.g. 19-nor-1,3,5(10) - stigmastatrien-3-ol, 19-nor-1,3,5(10)-campestatrien-3-ol, and 19-nor-1,3,5(10)-cholestatrien-3-ol and esters and ethers thereof) to the microbiological action of a culture of a microorganism which is capable of utilizing a sterol as a sole carbon source. Such microorganisms are well known in the art and include certain species within the genera Corynebacterium, Nocardia, Proactinomyces, Pseudomonas, and Mycobacterium.

According to our invention, the microbiological action of a microorganism capable of utilizing a sterol as a sole carbon source is continued on a 3-hydroxy-$\Delta^{1,3,5(10)}$-derivative under aerobic conditions in the presence of an assimilable nitrogen source such as yeast until an isolable quantity of a 17-keto-C-18-steroid (e.g. estrone and ethers thereof) is present, after which said 17-keto-C-18-steroid is isolated.

The presence of a carbon source other than the 3-hydroxy-$\Delta^{1,3,5(10)}$-sterol intermediate is not necessary for the aforedescribed microorganism to effect conversion of said intermediate to estrone; however, the rate of reaction, i.e. the speed with which the 3-hydroxy-$\Delta^{1,3,5(10)}$-sterol intermediate is converted to estrone, is materially increased by the presence of additional nutrients (such as an assimilable carbon source supplied by a carbohydrate, e.g. cerelose) during incubation of the microorganism prior to the addition of the 3-hydroxy-$\Delta^{1,3,5(10)}$-sterol derivative, and continuing during the microbiological interaction thereof. The microorganism and sterol intermediate may be simultaneously introduced into a medium containing an additional assimilable carbon source (such as cerelose). In this case, there will be an incubation period during which the rate of conversion to estrone will remain about the same as the rate of conversion without the presence of the additional carbon source, after which the rate of reaction will increase measurably.

When the aromatic-A-ring intermediate is esterified at C–3, such as in 3-acetoxy-19 - nor - 1,3,5(10) - stigmastatriene, hydrolysis occurs under the conditions of our microbiological degradation process and there is obtained the 3-hydroxy-17-ketosteroid, e.g. estrone. On the other hand, an ether function at C–3, such as 3-methoxy-19-nor-1,3,5(10)-stigmastatriene will usually remain unchanged throughout the microbiological conversion, and there is produced an ether derivative of estrone, e.g. estrone methyl ether. In general, it is preferred to utilize as starting materials for our process the 3-hydroxy-19-nor-1,3,5(10)-triene sterol analogs.

In a preferred mode of our novel process, 19-nor-1,3,5(10)-cholestatrien - 3 - ol is subjected to the microbiological action of a culture of the microorganism Corynebacterium sp., ATCC 14887 (Nocardia restrictus) under aerobic conditions in a broth medium comprising 1% yeast extract and 1% cerelose at temperatures within a range of about 20–30° C. (preferably at about 26–28° C.), utilizing fermentation techniques similar to those known in the art whereby oxidative cleavage of the side chain at C–17 occurs.

To obtain a desirable growth of a microorganism such as Corynebacterium sp., ATCC 14887 (Nocardia restrictus) for the process of this invention, a suitable nutrient medium is prepared containing assimilable carbon and nitrogen, cofactors and inorganic salts. The 3-hydroxy-$\Delta^{1,3,5(10)}$- sterol derivative as a solid or dissolved or suspended in ethanol, acetone, or preferably dimethylacetamide, or any other water-miscible solvent which is non-toxic to the organism, is added to the cultivated microorganism in a broth medium under sterile condition. This culture is then shaken, aerated, or simultaneously aerated and agitated, in order to enhance the growth of the Nocardia restrictus and the biological conversion of the $\Delta^{1,3,5(10)}$- sterol substrate. The 3-hydroxy-$\Delta^{1,3,5(10)}$- sterol derivative may be added to the broth medium and then inoculated with the bacterium, or the $\Delta^{1,3,5(10)}$- sterol derivative may be added to the cultivated microorganism in broth medium. As disclosed hereinabove, this latter procedure greatly increases the rate of conversion of the 3-hydroxy-$\Delta^{1,3,5(10)}$- sterol analog to estrone and, thus, is the preferred procedure. Alternatively, enzyme preparations obtained in known manner from cultures of Nocardia restrictus may be used for carrying out our process.

In our process as disclosed hereinabove, we have found that a long incubation period is usually required before the microorganism effects oxidative cleavage of the sterol side chain, and there is formed the desired 17-keto compound, i.e. estrone or ether derivative thereof. We have found, for example, when converting 19-nor-1,3,5(10)-cholestatrien-3-ol to estrone by the microbiological action of Corynebacterium sp., ATCC 14887 (Nocardia restric-

*tus*), according to the preferred mode of our invention, it usually takes about ten days (240 hours) in order to effect conversion to an isolable quantity of estrone. In our process, therefore, the medium containing the sterol derivative and the microorganism is usually incubated until estrone is found in the medium as determined by analytical procedures such as by thin layer chromatography. Usually the microbiological transformation is carried out simultaneously in several flasks containing aliquot portions of medium and steroid. After a suitable interval, an aliquot is withdrawn and analyzed for the presence of estrone or an ether thereof (if a 3-alkoxy-19-nor-$\Delta^{1,3,5(10)}$- starting compound was used) by thin layer chromatography. If estrone or an ether thereof is not detected, incubation is continued until another analyzed portion of the medium shows the presence of the desired 17-keto steroid, estrone.

Isolation of the estrone or a lower alkoxy derivative thereof from the fermentation mixture is easily effected by utilizing techniques well known in the art such as extraction, chromatography, and crystallization. In a preferred mode of our process, the fermentation broth is extracted with chloroform, followed by preparative layer chromatography of the residue of said chloroform extract on silica gel which is developed by chloroform/ethyl acetate, and finally, crystallization of the chromatographed residue from ethyl acetate yields estrone.

Although the microorganism Corynebacterium sp., ATCC 14887 (*Nocardia restrictus*) is conveniently utilized in our novel process whereby a 19-nor-1,3,5(10)-triene derivative of a sterol is oxidatively degraded to the corresponding 17-keto-19-nor-1,3,5(10)-estratriene, there can be utilized any microorganism which is capable of utilizing a sterol as the sole carbon source, examples of which include Nocardia sp. (ATCC 13259) (also identified as *Nocardia corallina*), Proactinomyces sp., Pseudomonas sp. (ATCC 13261) and (ATCC 13262), *Mycobacterium smegmatis,* and the like.

The class of compounds identified as "sterols" from which are derived the necessary 3-hydroxy-19-nor-$\Delta^{1,3,5(10)}$- sterol intermediates of our process (as described hereinbelow) are well known in the art and may be defined as a group of solid, monohydric alcohols derived from vegetable and animal sources, all of which are characterized by having a cyclopentanophenanthrene nucleus with a hydroxy group at C–3, and a side chain at C–17 (said side chain usually being a hydrocarbon having at least eight carbon atoms), the A and B-rings of said cyclopentanophenanthrene nucleus being either saturated or having a $\Delta^5$- or $\Delta^7$- double bond.

Example of sterols from which may be derived the necessary 3-hydroxy-1,3,5(10)-tri-dehydro intermediates of our process are such as cholesterol, sitosterol, campesterol, stigmasterol, zymosterol, spinasterol, and the like.

Included among the 19-nor-1,3,5(10)-triene sterol analogs which are conveniently utilized as intermediates in our novel process are 19-nor-1,3,5(10)-campestatrien-3-ol, 19-nor-1,3,5(10)-cholestatrien-3-ol and 19-nor-1,3,5(10)-stigmastatrien-3-ol (from $\beta$-sitosterol) the esters and ethers thereof, as well as their epimers. Of the foregoing, 19-nor-1,3,5(10)-cholestatriene is known. Other 19-nor-1,3,5(10)-triene sterol analogs are conveniently prepared from sterols via procedures known in the art, and preferably from sterols having a $\Delta^5$- bond. Thus, by way of example, $\beta$-sitosterol (i.e. 5-stigmasten-3$\beta$-ol) is subjected to an Oppenauer oxidation (e.g. oxidation with aluminum tertiary butoxide in acetone and benzene) or to oxidation with chromic oxide in acetone/sulfuric acid followed by treatment with base to give the corresponding 3-keto-$\Delta^4$-structure (i.e. 4-stigmasten-3-one). Introduction of a 1-dehydro bond is effected via known procedures such as those utilizing selenium dioxide or dichlorodicyanobenzoquinone. The 3-keto-1,4-bis-dehydro sterol derivative thereby formed, e.g. 1,4-stigmastadien-3-one, is then converted to a 3-hydroxy-aromatic-A-ring sterol derivative, e.g. 19-nor-1,3,5(10)-stigmastatrien-3-ol via known procedures utilizing lithium and biphenyl in tetrahydrofuran.

Alternatively, the 19-nor-1,3,5(10)-triene sterol intermediate of our novel process may be derived from a sterol, e.g. $\beta$-sitosterol, by initially hydrogenating the sterol with hydrogen over a platinum catalyst in the presence of an acidic promoter to obtain the corresponding saturated derivative, e.g. 5$\alpha$-sitostanol (5$\alpha$-stigmastan-3$\beta$-ol). Oxidation at C–3 to produce a 3-keto-A-ring saturated derivative, e.g. 5$\alpha$-stigmastan-3-one, may then be effected utilizing chromic acid (in acetic acid or in acetone and sulfuric acid or in a two phase system with ethylene dichloride and aqueous sulfuric acid). Other known oxidizing agents which may be used to oxidize the 3-hydroxy group are such as N-bromo-acetamide, cyclohexanone-aluminum isoproxide, oxygen together with a noble metal catalyst, and the like. Bromination of the 3-keto-A-ring saturated derivative (e.g. 5$\alpha$-stigmastan-3-one) in acetic acid-dioxane to which is added hydrogen bromide yields the corresponding 2,4-dibromide (e.g. 2,4-dibromo-5$\alpha$-stigmastan-3-one) which, upon dehydrobromination with lithium carbonate and lithium bromide is converted to the corresponding 1,4-diene (e.g. 1,4-stigmastadien-3-one). Aromatization of the A-ring is then accomplished via known procedures such as that utilizing lithium and biphenyl in tetrahydrofuran to produce the 3-hydroxy-19-nor-1,3,5(10)-triene sterol analog (e.g. 3-hydroxy-19-nor-1,3,5(10)-stigmastatrien-3-ol), a requisite intermediate for our process.

Our process, whereby a 3-hydroxy-aromatic-A-ring sterol analog or a 3-ester or 3-ether thereof is converted to esterone or a 3-ether thereof, via the microbiological oxidative degradation of the sterol side chain at C–17, provides a convenient and inexpensive source of estrone, a known, therapeutically valuable hormone per se, as well as a useful intermediate in the preparation of other valuable known estrogens such as estradiol and 17$\alpha$-ethinylestradiol.

$\beta$-Sitosterol, campesterol, and cholesterol provide the most convenient source from which are derived 3-hydroxy-19-nor-1,3,5(10)-triene sterol derivatives (necessary intermediates in our process). Of these, $\beta$-sitosterol and campesterol are derived from soybeans, $\beta$-sitosterol being presently accumulated as a waste from the isolation of stigmasterol from soybean sterol fraction. Thus, 19-nor-1,3,5(10)-stigmastatrien-3-ol, a starting compound of our process, is derived from a sterol now believed to be useless. It is to be understood that, in addition to $\beta$-sitosterol, the three epimers thereof (whose configurations include the remaining possibilities at C–20 and C–24) may also be used as intermediates in the preparation of the corresponding, respective epimeric 19-nor-1,3,5(10)-stigmastatrien-3-ol, each of which will yield estrone, upon continued treatment with an organism such as Corynebacterium sp. (*Nocardia restrictus*) according to our process.

Additionally, a mixture of the aforementioned sterols might be converted to a mixture of the corresponding 19-nor-1,3,5(10)-triene sterol analogs, which, upon microbiological treatment with *Nocardia restrictus* according to our process, will form estrone.

The following examples are illustrative of our novel process and some of the novel compounds produced thereby, and are not to be construed as limiting the scope thereof; the scope of our invention being limited only by the appended claims.

Preparation I.—19-nor-1,3,5(10)-stigmastatrien-3-ol

A. 4-stigmasten-3-one.—To a solution of 3.2 g. of 5-stigmasten-3$\beta$-ol ($\beta$-sitosterol) in 75 ml. of acetone add, dropwise, a solution of 8 g. of aluminum tertiary butoxide in 50 ml. of dry benzene. Stir the reaction mixture at reflux temperature for eight hours, then cool, add 20 ml. of water, then 200 ml. of dilute sulfuric acid (about 2.5 percent). Separate the aqueous layer from the reaction mixture, dry the organic layer over sodium sulfate and evaporate in vacuo to a residue comprising 4-stigmasten-3-one. Purify the crystallized product from acetone/methanol.

B. 1,4-stigmastadien-3-one.—Stir a mixture of 4.1 g. of 4-stigmasten-3-one and 2.7 g. of dichlorodicyanobenzoquinone in 150 ml. of benzene at reflux temperature for 30 hours. Remove the precipitated hydroquinone by filtration, then pass the filtrate through a column of alumina (40 g.). Elute the column with chloroform, then evaporate the combined eluates in vacuo to a residue comprising 1,4-stigmastadien-3-one. Purify by crystallization from methanol.

C. 19-nor-1,3,5(10)-stigmastatrien-3-ol.—Add 140 mg. of lithium ribbon to a solution of 3.2 g. of biphenyl in 10 ml. of dry tetrahydrofuran. Stir the reaction mixture under an atmosphere of nitrogen at reflux temperature until the lithium metal has dissolved (about one hour). Allow the reaction solution to cool to about 35° C., then add a solution of 2 g. of 1,4-stigmastadien-3-one in 5 ml. of tetrahydrofuran. Continue stirring for 30 minutes, then add water to the reaction mixture until the green color is discharged. Acidify the reaction mixture with dilute sulfuric acid, then extract with ether. Evaporate the combined ether extracts to a residue, then steam distill the resultant residue. Isolate the nonvolatile material by extraction with ether. Evaporate the ether extracts to a small volume, then apply ether solution on a column of silica gel (80 g.). Elute with ether-hexane, first with 1–5 percent ether-in-hexane, then with 10 percent ether-in-hexane. Combine the 10 percent ether-in-hexane eluates and concentrate to a residue comprising 19-nor-1,3,5(10)-stigmastratrien-3-ol. Purify by crystallization from pentane.

Preparation II.—19-nor-1,3,5(10)-campestratrien-3-ol

Treat 3.2 g. of 5-campesten-3β-ol (campesterol) with aluminum tertiary butoxide in acetone and isolate the resultant product in a manner similar to that described in Preparation I–A to obtain 4-campesten-3-one.

In turn, treat the 4-campesten-3-one thereby produced with dichlorodicyanobenzoquinone at reflux temperature in the manner of Example 1B and isolate the resultant product in the manner described to obtain 1,4-campestadien-3-one.

Treat 2 g. of 1,4 campestadien-3-one in tetrahydrofuran with lithium and biphenyl in a manner similar to that described in Preparation I–C.

Isolate and purify the resultant product in a manner similar to that described to obtain 19-nor-1,3,5(10)-campestratrien-3-ol.

Preparation III.—19-nor-1,3,5(10)-cholestratrien-3-ol

In a manner similar to that described in Preparation I–A, treat 3.2 g. of 5-cholesten-3β-ol (cholesterol) with aluminum tertiary butoxide in acetone, then isolate and purify the resultant product in a manner similar to that described to obtain 4-cholesten-3-one. In turn, treat 4 g. of 4-cholesten-3-one thereby produced with dichlorodicyanobenzoquinone at reflux temperature in the manner of Preparation I–B. Isolate and purify the resultant product in a manner similar to that described to obtain 1,4-cholestadien-3-one.

React 2 g. of 1,4-cholestadien-3-one with lithium and biphenyl in tetrahydrofuran in a manner similar to that described in Preparation I–C. Isolate and purify the resultant product in a manner described to obtain 19-nor-1,3,5(10)-cholestratrien-3-one.

Preparation IV.—Esters of 19-nor-1,3,5(10)-stigmastatrien-3-ol

A. 3 - lower alkanoyloxy - 19 - nor-1,3,5(10)-stigmastatrien-3-ol.—Dissolve 1 g. of 19-nor-1,3,5(10)-stigmastatrien-3-ol in 10 ml. of pyridine and 5 ml. of acetic anhydride. Allow the solution to stand at 25° C. for 18 hours, then add 1 ml. of water and pour the reaction mixture into ice cold aqueous hydrochloric acid. Extract the aqueous mixture with methylene chloride. Wash the combined extracts to neutrality with water. Dry over magnesium sulfate, filter, and evaporate the filtrate to a residue comprising 3 - acetoxy-19-nor-1,3,5(10)-stigmastatriene. Purify by crystallization from acetone-hexane.

Similarly, by utilizing the above procedure, but substituting for acetic anhydride each of the following said anhydrides, i.e. propionic acid anhydride, caproic acid anhydride, caprylic acid anhydride, there is obtained the following: 19-nor-1,3,5(10)-stigmastatrien-3-ol 3-propionate, 19-nor-1,3,5(10)-stigmastatrien-3-ol 3-caproate, and 19-nor-1,3,5(10)-stigmastatrien-3-ol 3-caprylate, respectively.

In a similar manner, treat each of 19-nor-1,3,5(10)-campestatrien-3-ol, and 19-nor-1,3,5(10)-cholestatrien-3-ol with acetic anhydride in pyridine. Isolate and purify the resultant product in the above described manner to obtain, respectively, 3-acetoxy-19-nor-1,3,5(10)-campestatriene and 3-acetoxy-19-nor-1,3,5(10)-cholestatriene.

B. 3 - benzoyloxy - 19 - nor-1,3,5(10)-stigmastatrien-3-ol.—To a solution of 1 g. of 19-nor-1,3,5(10)-stigmastatrien-3-ol in 20 ml. of pyridine cooled to 10° C., add with stirring 2.5 ml. of benzoyl chloride. Stir the reaction mixture at room temperature for 16 hours, then pour into water. Add excess of 10% aqueous sodium carbonate solution, then extract with methylene chloride. Combine the methylene chloride extracts, wash with 10% aqueous hydrochloric acid, then with water, dry over magnesium sulfate, filter and evaporate to a residue comprising 3-benzoyloxy 19-nor-1,3,5(10)-stigmastatriene. Purify by crystallization from methanol.

Similarly, treat each of 19-nor-1,3,5(10)-campestratrien-3-ol and 19-nor-1,3,5(10)-cholestatrien-3-ol with benzoyl chloride in pyridine in the manner described above to obtain, respectively, 3-benzoyloxy-19-nor-1,3,5(10)-campestatriene and 3-benzoyloxy - 19 - nor-1,3,5(10)-cholestatriene.

Preparation V.—3-methoxy-19-nor-1,3,5(10)-stigmastatriene

A. Dissolve 1 g. of 19-nor-1,3,5(10)-stigmastatrien-3-ol in 10 ml. of methanol, to which is added an ethereal solution of diazomethane until the yellow color persists overnight. Evaporate the reaction mixture to a residue comprising 3-methoxy-19-nor-1,3,5(10)-stigmastatriene.

B. In a similar manner, treat each of 19-nor-1,3,5(10)-campestatrien-3-ol and 19-nor-1,3,5(10)-cholestatrien-3-ol with methanol and ethereal diazomethane in the manner described in Preparation V–A above to obtain, respectively 3 - methoxy-19-nor-1,3,5(10) - campestatriene and 3 - methoxy-1,3,5(10)-cholestatriene.

EXAMPLE 1

Preparation of estrone

A. Prepare an inoculum by subculturing a loopful of a culture of Corynebacterium sp., ATCC 14887 (*Nocardia restrictus*) from an agar slant (1% yeast extract, 1% cerelose, 2% agar) to 100 ml. of sterile broth medium (comprising 1% yeast extract and 1% cerelose maintained in a 300 ml. Erlenmeyer flask). Incubate the flask for 48 hours at 26–28° C. on a shaker running at 280 strokes per minute.

B. In each of a series of ten flasks containing 100 ml. of broth medium, add 3% by volume of the 48-hour culture prepared in the preceding paragraph, then incubate the flasks for 48 hours at 26–28° C. with shaking. To each of these ten flasks then add a solution of 10 mg. of 19 - nor - 1,3,5(10)-cholestatrien-3-ol (Preparation III) dissolved in 1 ml. of dimethylformamide.

Replace the flasks on the shaker and incubate. Remove 5 ml. aliquots from one flask at intervals, such as after 90, 138 and 234 hours of incubation. Extract each aliquot with chloroform, evaporate to a residue, and analyze this residue by means of thin layer chromatography, using estrone and 19-nor-1,3,5(10)-cholestatrien-3-ol as reference substances on the same chromatogram. After 240 hours, combine the contents of the ten flasks, extract with chloroform, and evaporate the combined extracts in vacuo to a residue comprising estrone 1,3,5(10)-estratrien-3-ol-17-one.

Purify by suspending the estrone residue in chloroform, filtering the chloroform solution, followed by evaporation of the filtrate at 50° C. in vacuo until the solution is free from volatile components. Subject the residue to separation by means of preparative layer chromatography using a 1 mm. thick layer plate (20 x 20 cm.) of silica gel $GF_{254}$, and utilize as developing solvent, chloroform/ethyl acetate (9:1 by volume). Visualize the bands by means of ultraviolet light, and by iodine vapors applied to one edge of the plate. Isolate the phenolic material (i.e. that band which stains yellow with iodine) by continuous extraction with chloroform. Combine the chloroform extracts, evaporate in vacuo, and crystallize from ethyl acetate to give estrone.

C. In a manner similar to that described in Example 1B, subject each of 19-nor-1,3,5(10)-campestatrien-3-ol (Preparation II) and 19-nor-1,3,5(10)-stigmatstatrien-3-ol (Preparation I) to the action of a culture of Corynebacterium sp., ATCC 14887 (*Nocardia restrictus*) until estrone is found as determined by thin layer chromatography using estrone and 19-nor-1,3,5(10)-campestatrien-3-ol and 19-nor-1,3,5(10)-stigmastatrien-3-ol, respectively, as reference substances on the chromatogram. Isolate and purify the resultant product in a manner similar to that described whereby is obtained estrone (1,3,5(10)-estratrien-3-ol-17-one).

D. In a manner similar to that described in Example 1B, subject each of 3-acetoxy-19-nor-1,3,5(10)-stigmastatriene, 3-acetoxy-19-nor-1,3,5(10)-campestatriene, and 3-acetoxy-19-nor-1,3,5(10)-cholestatriene (Preparation IV–A) to the action of a culture of Corynebacterium sp., ATCC 14487 (*Nocardia restrictus*) until estrone is found as determined by thin layer chromatography using estrone and the respective starting 3-acetates as reference substances on the same chromatogram. Isolate and purify the resultant products in a manner similar to that described in Example 1B, whereby is obtained estrone.

EXAMPLE 2

Preparation of estrone 3-methyl ether

In a manner similar to that described in Example 1B, subject each of 3-methoxy-19-nor-1,3,5(10)-stigmastatrien, 3-methoxy-19-nor-1,3,5(10)-campestatriene, and 3-methoxy-19-nor-1,3,5(10) - cholestatriene (Preparation V) to the action of a culture of Corynebacterium sp., ATCC 14487 (*Nocardi restrictus*) until estrone methyl ether is found as determined by thin layer chromatography using estrone and the respective 3-methoxy starting materials as reference substances on the same chromatogram. Isolate and purify the resultant product in a manner similar to that described to obtain estrone methyl ether.

In a similar manner, by subjecting 3-ethoxy-19-nor-1,3,5(10)-cholestatrien-3-ol to the action of a culture of Corynebacterium sp. ATCC 14487 (*Nocardia restrictus*), in a manner similar to that described in Example 1–B, there is obtained estrone ethyl ether.

We claim:
1. In the process for preparing estrone from a sterol, the steps which comprise subjecting a 19-nor-$\Delta^{1,3,5(10)}$-derivative of said sterol having at C–3 a member of the group consisting of hydroxy, lower alkanoyloxy and lower alkoxy, and having the C–17 side chain of said sterol, to the microbiological action of Corynebacterium sp., ATCC 14887 (*Nocardia restrictus*); and isolating the estrone thereby formed.

2. The process of claim 1 wherein said sterol derivative is a member selected from the group consisting of 19-nor-1,3,5(10)-stigmastatrien-3-ol, 19 - nor - 1,3,5(10)-campestatrien-3-ol, 19-nor-1,3,5(10)-cholestatrien-3-ol, the epimers thereof, and the 3-lower alkyl ethers and the 3-lower alkanoates of the foregoing.

3. The process of claim 2 wherein said sterol derivative is 19-nor-1,3,5(10)-cholestatrien-3-ol.

4. The process of claim 2 wherein said sterol derivative is 19-nor-1,3,5(10)-stigmastatrien-3-ol.

5. The process of claim 3 wherein 19-nor-1,3,5(10)-cholestatrien-3-ol is subjected to the microbiological action of Corynebacterium sp., ATCC 14887 (*Nocardia restrictus*) for about 240 hours in the presence of assimilable carbon at temperatures in the range of about 26° C. to about 28° C.; and there is isolated the estrone thereby formed.

References Cited

UNITED STATES PATENTS 3,398,054   8/1968   Vezina et al. _____ 195—51

ALVIN E. TANENHOLTZ, *Primary Examiner.*

U.S. Cl. X.R.

260—397.4, 397.5

UNITED STATES PATENT OFFICE
CERTIFICATE OF CORRECTION

Patent No. 3,451,892                    Dated  June 24, 1969

Inventor(s)   Hershel L. Herzog and Adriano Afonso

It is certified that error appears in the above-identified patent and that said Letters Patent are hereby corrected as shown below:

Column 4, line 33, the first word, i.e. "esterone" should read -- estrone --.

Column 7, line 36 and column 8, lines 3 and 12, the ATCC identifying number "14487" in each occurrence should read -- 14887 --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents